US012493531B1

(12) United States Patent
Mekhanik et al.

(10) Patent No.: US 12,493,531 B1
(45) Date of Patent: Dec. 9, 2025

(54) DATA STORAGE DEVICE AND METHOD FOR BYPASSING A READ-ONLY MODE TO ALLOW USER DATA BACKUP

(71) Applicant: Sandisk Technologies, Inc., Milpitas, CA (US)

(72) Inventors: Evgeny Mekhanik, Rehovot (IL); Meytal Soffer, Kibbutz Yechiam (IL); Yair Sommer, Kibbutz Yechiam (IL); Noam Even-Chen, Kibbutz Saad (IL)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/735,878

(22) Filed: Jun. 6, 2024

(51) Int. Cl.
*G06F 11/00* (2006.01)
*G06F 11/14* (2006.01)

(52) U.S. Cl.
CPC ...... *G06F 11/1466* (2013.01); *G06F 11/1417* (2013.01); *G06F 11/1451* (2013.01)

(58) Field of Classification Search
CPC ............. G06F 11/1466; G06F 11/1417; G06F 11/1451
See application file for complete search history.

(56) References Cited

U.S. PATENT DOCUMENTS

| | | | |
|---|---|---|---|
| 7,594,157 B2 | 9/2009 | Choi et al. | |
| 7,979,690 B1* | 7/2011 | Dyatlov | G06F 11/1417 713/1 |
| 8,549,237 B2 | 10/2013 | Evans | |
| 10,346,253 B2 | 7/2019 | Dain et al. | |
| 10,762,039 B2 | 9/2020 | Iwasaki et al. | |
| 2005/0177777 A1* | 8/2005 | Seaburg | G06F 11/1464 714/42 |
| 2007/0091692 A1 | 4/2007 | Greco et al. | |
| 2017/0364275 A1* | 12/2017 | Natarajan | G06F 12/0246 |
| 2024/0061963 A1* | 2/2024 | Dover | G06F 21/79 |

* cited by examiner

*Primary Examiner* — Jason B Bryan
(74) *Attorney, Agent, or Firm* — Crowell & Moring LLP (57) ABSTRACT

A data storage device and method are disclosed for bypassing a read-only mode to allow user data backup. In one embodiment, a data storage device is provided comprising a memory and one or more processors. The one or more processors, individually or in combination, are configured to: enter a read-only mode, wherein the read-only mode prevents performance of a write operation needed for a host to boot and back-up data stored in the memory; receive a command from a host to bypass the read-only mode; and in response to receiving the command, bypass the read-only mode to allow performance of the write operation needed for the host to boot and back-up data stored in the memory. Other embodiments are provided.

20 Claims, 7 Drawing Sheets

DATA STORAGE DEVICE AND METHOD FOR BYPASSING A READ-ONLY MODE TO ALLOW USER DATA BACKUP

BACKGROUND

If a data storage device enters read-only emergency mode due to some internal critical error or maintenance requirement, it may still be required to provide the stored data to the host. The host can send read commands that are required to be fully serviced. However, the write commands cannot be executed and shall return a device error. In some environments, during the boot-up process, the host writes some information to its internal boot/journaling tables, and the error as the response to the host write command may prevent the host from finishing the boot properly. Therefore, the stored data cannot be accessible for the backup.

DETAILED DESCRIPTION

The following embodiments generally relate to a data storage device and method for bypassing a read-only mode to allow user data backup. In one embodiment, a data storage device is provided comprising a memory and one or more processors. The one or more processors, individually or in combination, are configured to: enter a read-only mode, wherein the read-only mode prevents performance of a write operation needed for a host to boot and back-up data stored in the memory; receive a command from a host to bypass the read-only mode; and in response to receiving the command, bypass the read-only mode to allow performance of the write operation needed for the host to boot and back-up data stored in the memory.

In some embodiments, the command is received from the host during a host boot stage of a multi-stage boot process.

In some embodiments, the command is received from the host during a host kernel stage of a multi-stage boot process.

In some embodiments, the command comprises a flag from an application program interface in the host.

In some embodiments, the one or more processors, individually or in combination, are further configured to: receive a second command from the host to restore the read-only mode; and in response to receiving the second command, restore the read-only mode.

In some embodiments, the second command comprises a flag from an application program interface in the host.

In some embodiments, the read-only mode is entered in response to a number of spare blocks in the memory being below a threshold.

In some embodiments, the data storage device is embedded in the host.

In some embodiments, the memory comprises a three-dimensional memory.

In another embodiment, a method is provided that is performed in a host in communication with a data storage device comprising a memory, wherein the data storage device is operating in a read-only mode. The method comprises: sending a command to the data storage device to temporarily bypass the read-only mode; and while the read-only mode is temporarily bypassed: sending a write command to the data storage device during a booting process; and backing-up data stored in the memory of the data storage device.

In some embodiments, the command is sent during a host boot stage of a multi-stage boot process.

In some embodiments, the command is sent during a host kernel stage of a multi-stage boot process.

In some embodiments, the command comprises a flag from an application program interface in the host.

In some embodiments, the method further comprises sending a second command to the data storage device to restore the read-only mode.

In some embodiments, the second command comprises a flag from an application program interface in the host.

In some embodiments, the read-only mode is entered in response to a number of spare blocks in the memory being below a threshold.

In some embodiments, the data storage device is embedded in the host.

In some embodiments, the host comprises a mobile device.

In some embodiments, the memory comprises a three-dimensional memory.

In another embodiment, a data storage device is provided comprising: a memory; and means for bypassing a read-only mode to allow a host to boot and back-up data stored in the memory.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Figures 1A, 1B:
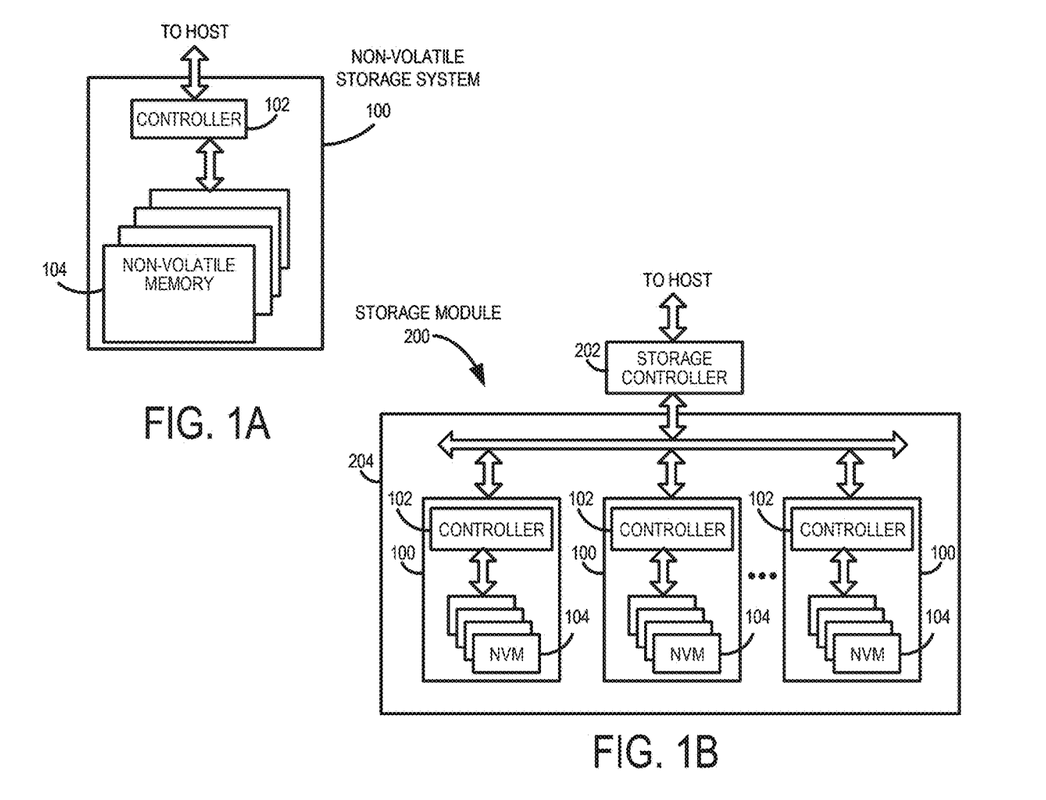
FIG. 1A is a block diagram of a data storage device of an embodiment.
FIG. 1B is a block diagram illustrating a storage module of an embodiment.
Figure 1C:
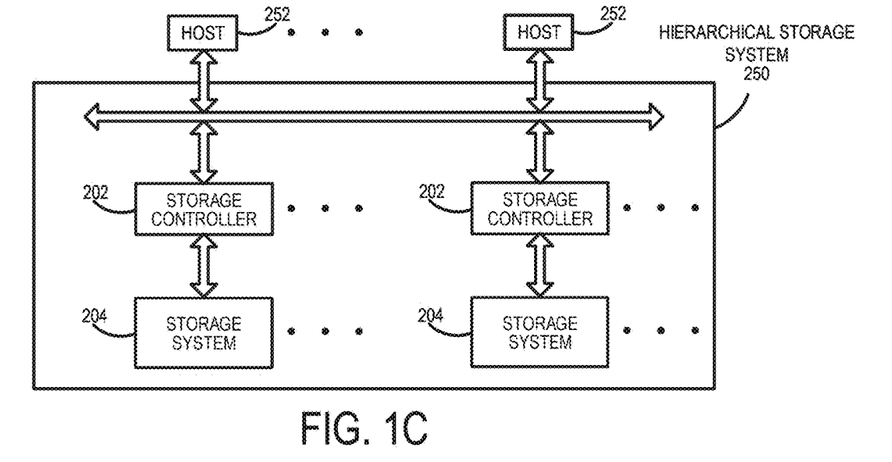
FIG. 1C is a block diagram illustrating a hierarchical storage system of an embodiment.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
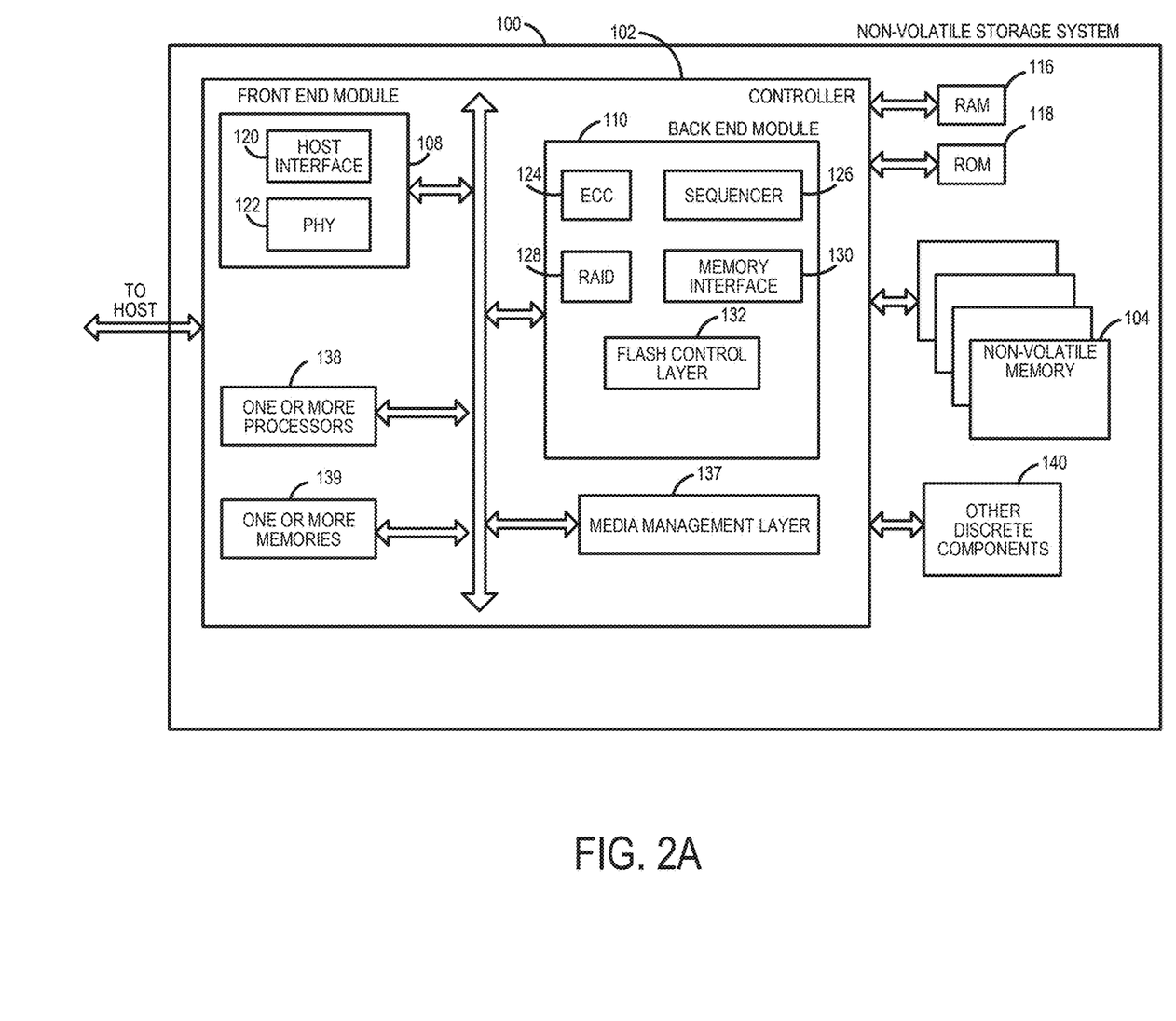
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR) interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCOE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller are optional components that are not necessary in the controller 102.

Figure 2B:
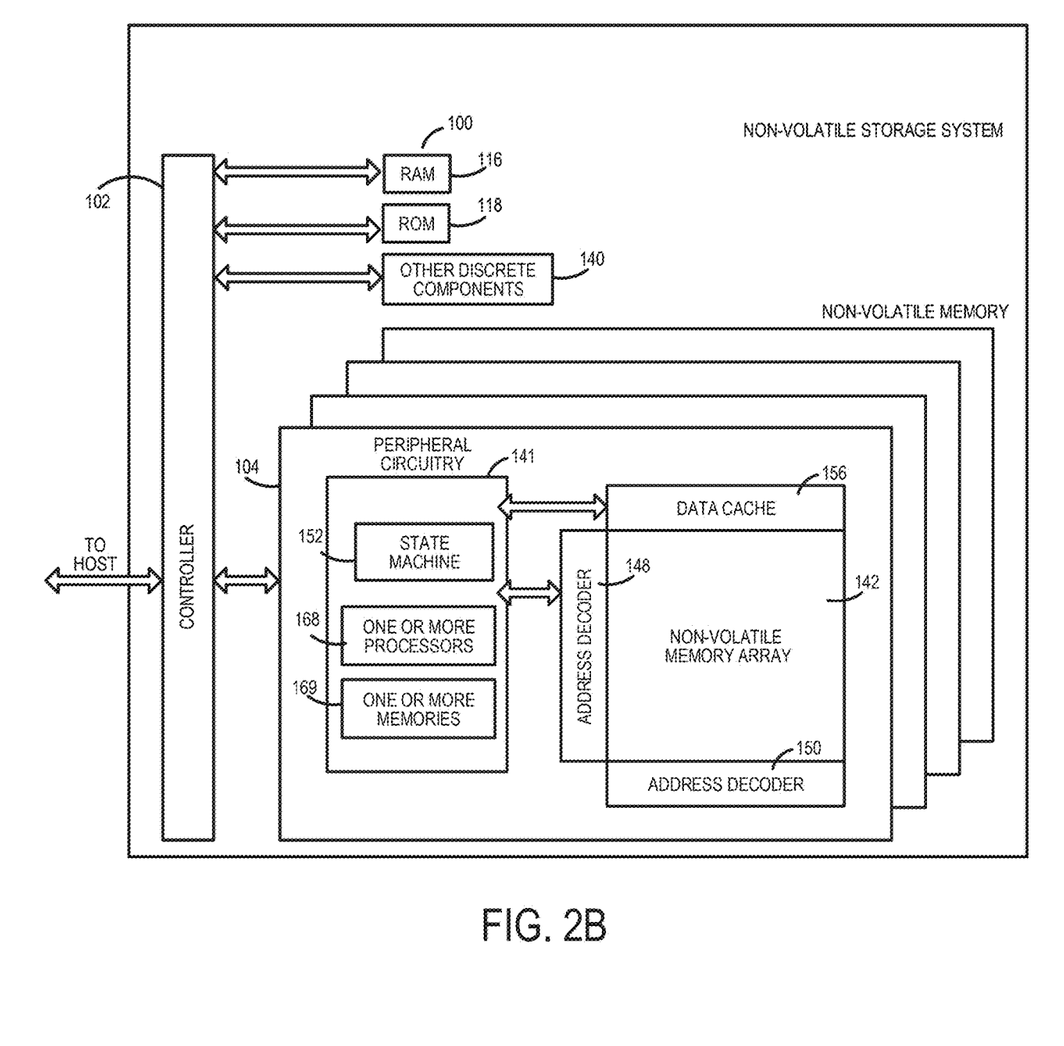
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data and address decoders 148, 150. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
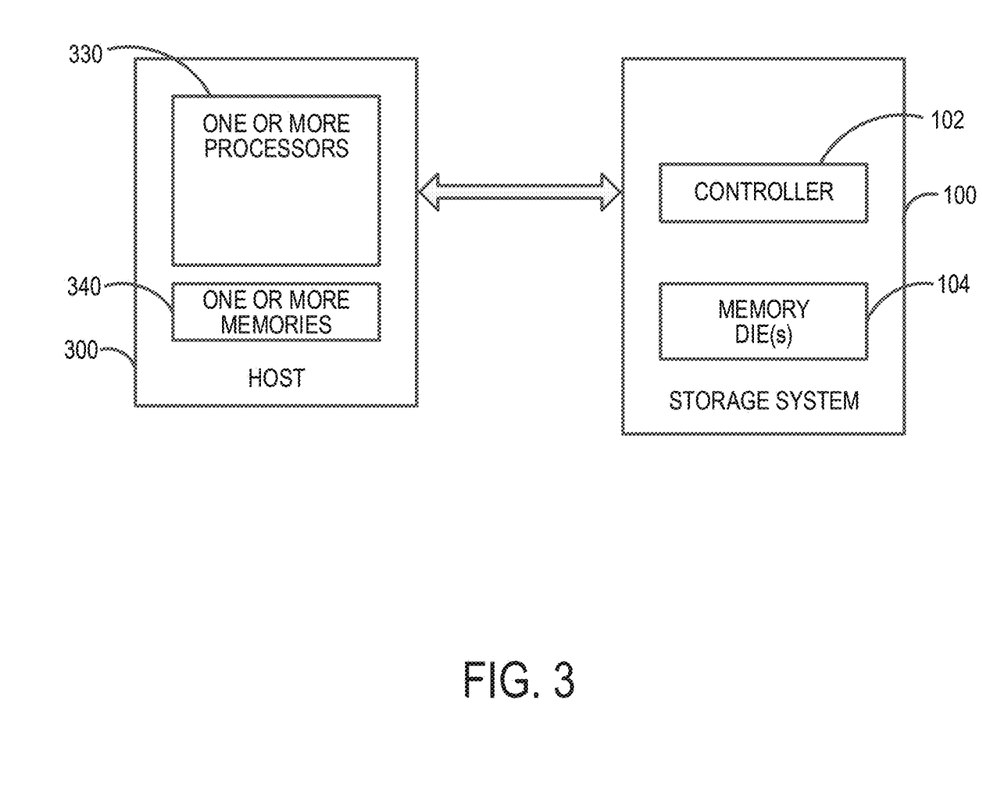
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

In some environments, such as when the data storage device 100 is embedded in the host 300 (e.g., a mobile device), the host 300 uses a two-stage boot process. In the first stage (sometimes referred to herein as the host boot stage), using boot code stored in its read-only memory (ROM), the host 300 reads boot-up code from the memory 104 of the data storage device 100. The host 300 stores the boot-up code in the host's volatile memory (e.g., RAM). In the second stage (sometimes referred to herein as the host kernel load stage), the host 300 reads larger amounts of data (e.g., for drivers, applications, etc.) from the memory 104 of the data storage device 100. During this two-stage boot-up process, the host 300 may write data to the memory 104 of the data storage device 100, such as a journal/log with a time stamp of the boot and the status of the boot.

Because this two-stage boot-up process requires writes to the memory 104 of the data storage device 100, the host 300 may not be able to boot if the data storage device 100 is in read-only mode. The controller 102 of the data storage device 100 can enter read-only mode, for example, when all of the spare blocks in the memory 104 have been used. More specifically, the memory 104 of the data storage device 100 can have one or more memory pools. For each memory pool, the data storage device 100 can reserve a certain number of spare blocks in the memory 104 to replace blocks in the memory 104 that have become bad during the lifetime of the memory 104. When all of the spare blocks are used, the controller 102 of the data storage device 100 can enter read-only mode. In read-only mode, write commands from the host 300 are rejected (e.g., with an error status), and internal write operations are minimized.

Because the data storage device 100 will not accept write commands from the host 300 when in read-only mode, the host 300 will not be able to boot if using a boot-up process that requires writes to the memory 104 of the data storage device 100. In this situation, the host 300 would not be able to read and back-up user or other data stored in the memory 104 of the data storage device 100. In some situations, special software on the host can be used that does not require write operations. However, in an embedded data storage device, the host may not be able to upload such software once the data storage device 100 enters read-only mode. In other situations, software on the data storage device 100 can be used that, when receiving a write command from the host 300, ignores the write command and does not report a read-only error. However, the behavior in this approach is not deterministic. That is, if the host 300 tries to read data that the data storage device 100 dropped without notification, another type of failure may occur.

Figure 4:
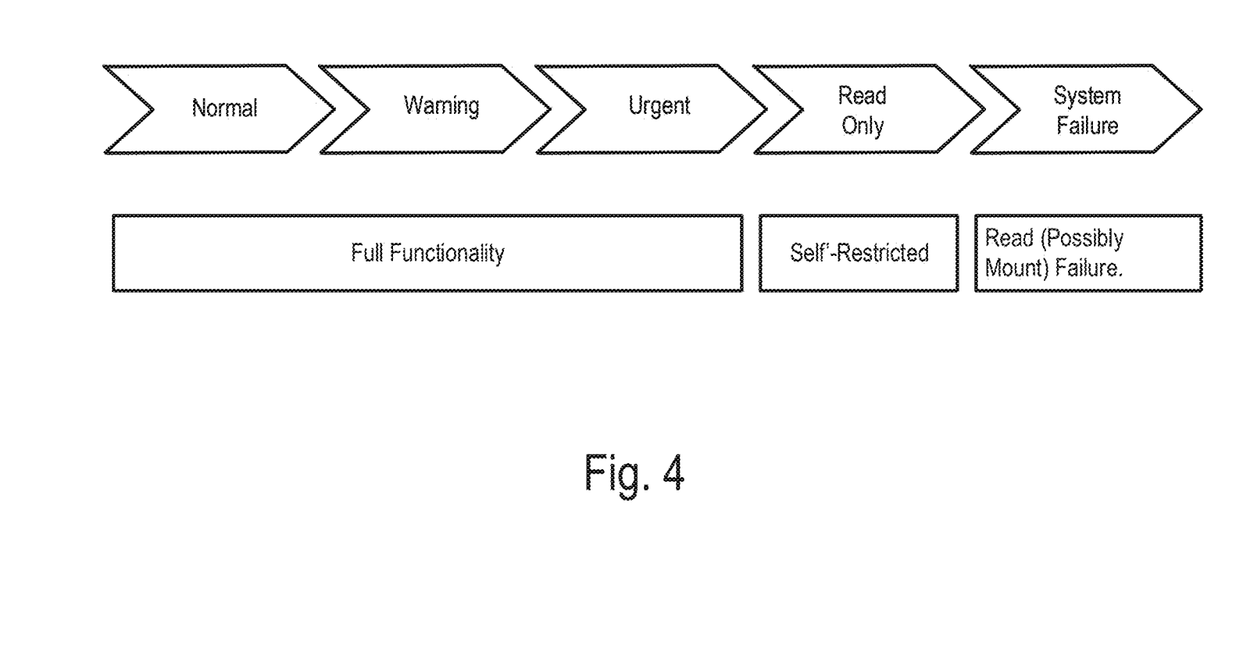
FIG. 4 is a diagram illustrating various modes of a data storage device of an embodiment.

Using special software on the host 300 or data storage device 100 is sometimes not practical, possible, or desired. To address this situation, the following embodiments provide a way for the host 300 to send a command to temporarily bypass the data storage device's read-only mode, so that the host 300 can boot and then read and back-up data stored in the memory 104 of the data storage device 100. This will sometimes be referred to herein as "read-only bypass." These embodiments take advantage of that fact that entering read-only mode when all of the spare blocks in the memory 104 have been used is just a precaution and that the memory 104 can actually accept write commands in this situation. As illustrated in FIG. 4, at the point of entering read-only mode, the data storage device 100 can still function correctly, so entering read-only mode can be considered a precaution to prevent a system failure. So, in this situation, the data storage device 100 can likely still function correctly to temporarily suspend read-only mode restrictions to allow the host 300 to boot and back-up data stored in the memory 104 of the data storage device 100. This functionality can give the host 300 better control over risk management. That is, if the data storage device 100 cannot boot due to being in read-only mode, the result from the user perspective is identical to read only. Bypassing read-only can dramatically increase the feasibility to back up user data.

Any suitable mechanism can be used to bypass read-only mode to allow user data backup. In one example implementation, an application program interface (API) on the host 300 (e.g., via the one or more processors 330 in the host 300 executing computer-readable program code) can be used to instruct the controller 102 of the data storage device 100 to bypass read-only mode. It should be understood that this is merely an example and that other implementations can be used that do not use an API on the host 300. In this example, the host API uses a new flag (bDisableReadOnly) to bypass the data storage device's read-only mode to allow the host 300 to read and backup the data stored in the memory 104 of the data storage device 100. Upon a reset, the flag returns to its default state where the read-only mode is enabled.

Figure 5:
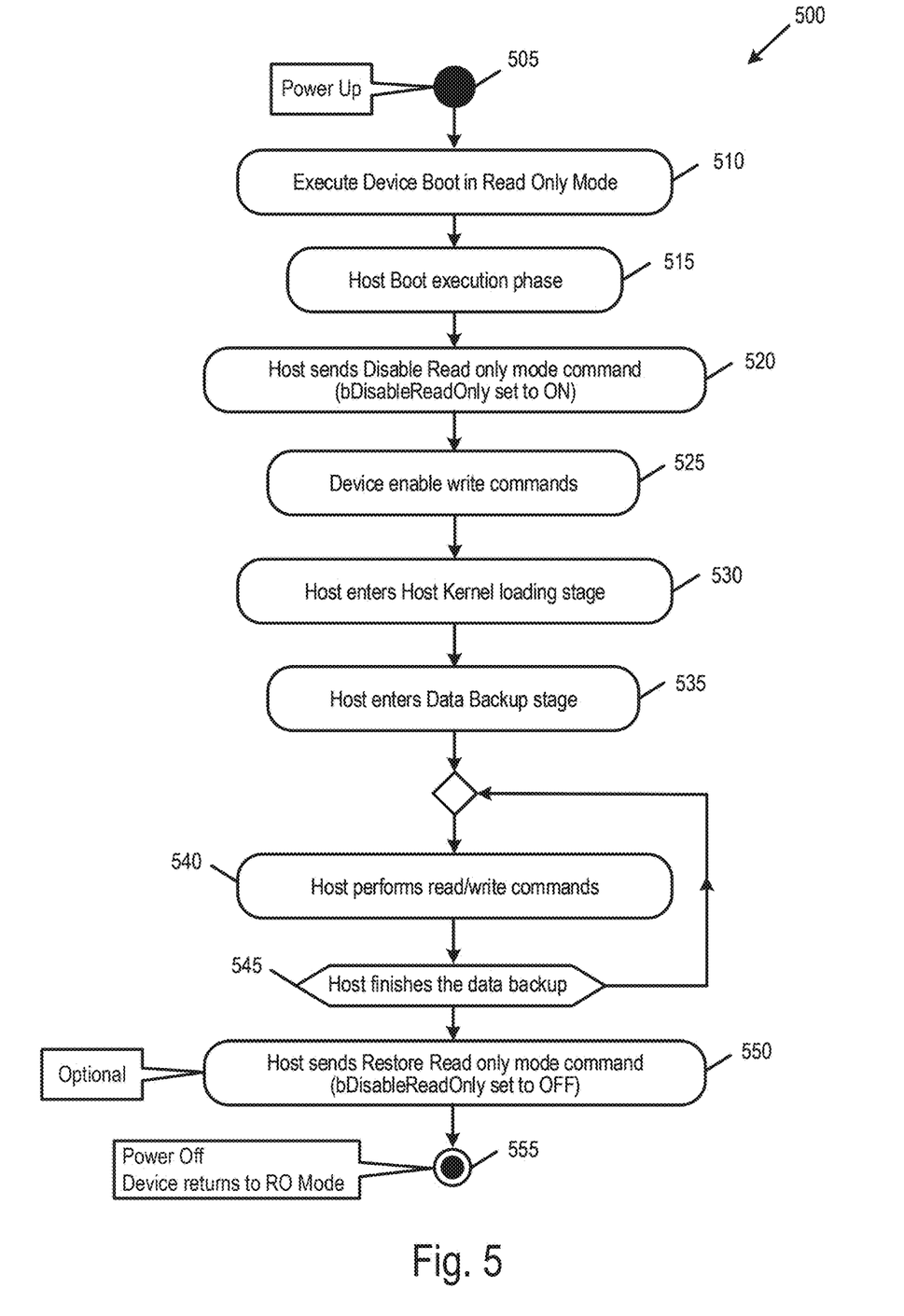
FIG. 5 is a flow chart of a method of an embodiment for disabling a read-only mode in a host boot stage.

Turning again to the drawings, FIG. 5 is a flow chart 500 of a method of an embodiment for disabling read-only mode in the host boot stage. As shown in FIG. 5, after power up (505), the controller 102 of the data storage device 100 enters a device boot phase, which discovers the read-only mode application at a very early stage of device boot and mount (510). The device initialization proceeds in read-only mode, where management operations and any update of management tables are not allowed. Next, the host 300 enters a host boot execution phase (515), which can involve a host ROM module/code being loaded from the data storage device 100.

The host 300 then sends a disable-read-only-mode command with the bDisableReadOnly flag set to on (520). (While this command is sent in the host boot stage in this example, as described below, the command can be sent in the host kernel stage.) The command can be sent once the host 300 gets an error on the very first write command and makes a retry. The controller 102 of the data storage device 100 then temporarily disables the read-only mode to allow write commands (525). Also, the host 300 enters a host kernel read phase in which the host bootloader (BLR) module/code loads the operational host code, host kernel, and other components (530). Next, the host 300 enters a data backup stage, in which the host 300 operates normally and makes the necessary data image backup to an external data storage device (535 and 540). After the host 300 finishes the data backup (545), the host 300 can, optionally, send a restore-read-only-mode command (with bDisableReadOnly set to off) to disallow further writes (550). The host 300 then switches the power off, and the controller 102 of the data storage device 100 returns to read-only mode (555).

Figure 6:
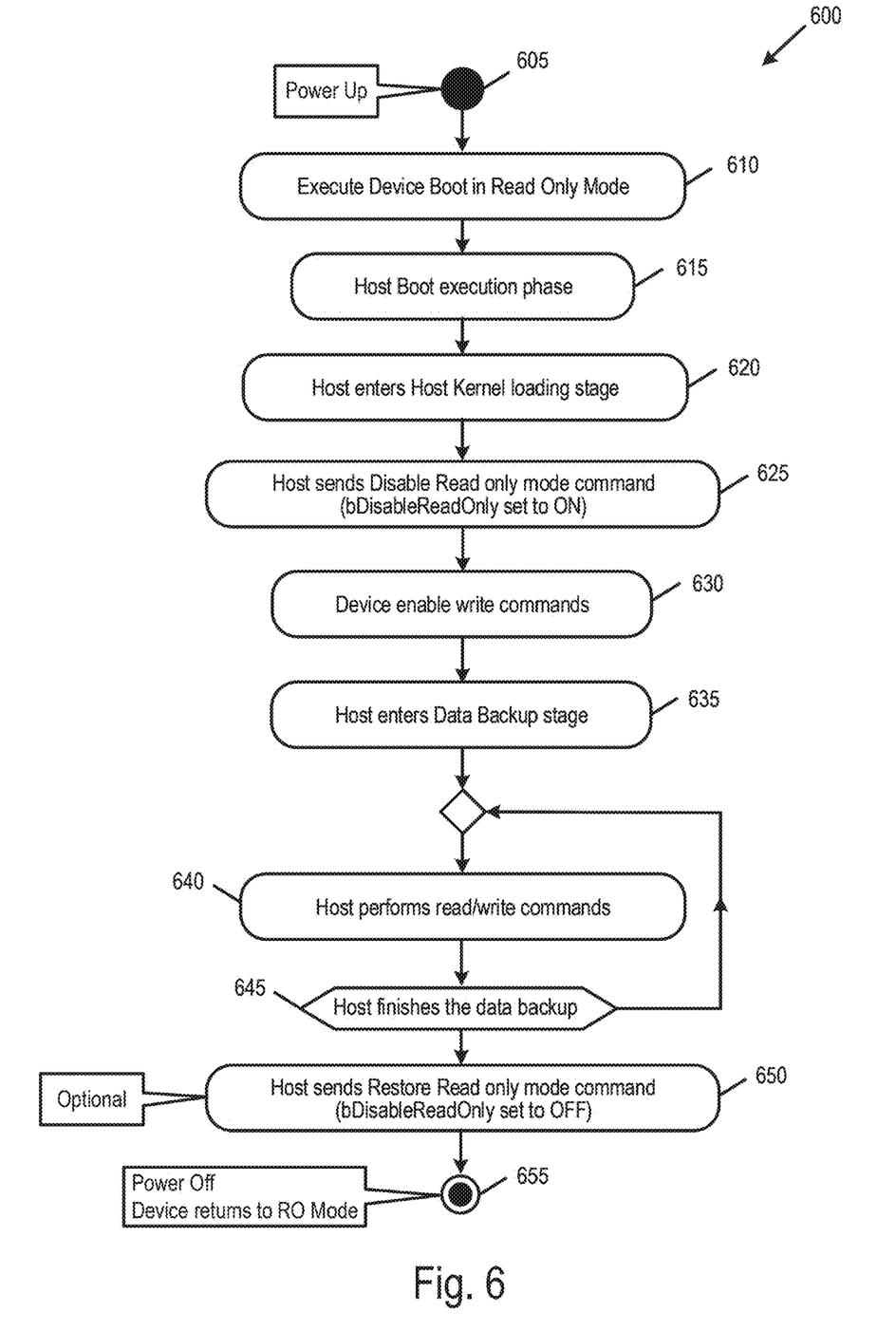
FIG. 6 is a flow chart of a method of an embodiment for disabling a read-only mode in a host kernel load stage.

As mentioned above, instead of the host 300 sending the disable-read-only-mode command to the data storage device 100 in the host boot stage, the host 300 can send the disable-read-only-mode command to the data storage device 100 in the load host kernel stage, which is illustrated in the flow chart 600 in FIG. 6. As shown in FIG. 6, after power up (605), the controller 102 of the data storage device 100 enters a device boot phase in read-only mode (610). The host 300 then enters a host kernel read stage (620) and sends a disable-read-only-mode command with the bDisableReadOnly flag set to on (625). The controller 102 of the data storage device 100 then temporarily disables the read-only mode to allow write commands (630). Next, the host 300 enters a data backup stage (635) and in which the host 300 performs read/write operations to back-up the data stored in the memory 104 onto a different data storage device (635 and 640). After the host 300 finishes the data backup (645), the host 300 can, optionally, send a restore-read-only-mode commend (with bDisableReadOnly set to off) to disallow further writes (650). The host 300 then switches the power off, and the controller 102 of the data storage device 100 returns to read-only mode (655).

There are several advantages associated with these embodiments. For example, these embodiments can be used to enable the host to boot a data storage device that is in read-only mode to back-up the user data stored in the memory of the data storage device. These embodiments also provide the advantage of being simple to implement and are associated with relatively-low implementation and execution time. These embodiments can also increase user customer control on the process, especially when an open API is used.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
    a memory; and
    one or more processors, individually or in combination, configured to:
      enter a read-only mode, wherein the read-only mode prevents a host from writing information in the memory needed for the host to boot the data storage device, wherein the information comprises a time stamp of the boot and a status of the boot;
      receive a disable read-only mode command from the host to bypass the read-only mode;
      in response to receiving the disable read-only mode command, bypass the read-only mode to allow the host to write the information in the memory needed for the host to boot the data storage device;
      receive read/write commands from the host to back-up data stored in the memory;
      after the host finishes backing up the data stored in the memory, receive a restore read-only mode command from the host; and
      re-enter read-only mode.

2. The data storage device of claim 1, wherein the disable read-only mode command is received from the host during a host boot stage of a multi-stage boot process.

3. The data storage device of claim 1, wherein the disable read-only mode command is received from the host during a host kernel stage of a multi-stage boot process.

4. The data storage device of claim 1, wherein the disable read-only mode command comprises a flag from an application program interface in the host.

5. The data storage device of claim 1, wherein the restore read-only mode command comprises a flag from an application program interface in the host.

6. The data storage device of claim 1, wherein the read-only mode is entered in response to a number of spare blocks in the memory being below a threshold.

7. The data storage device of claim 1, wherein the data storage device is embedded in the host.

8. The data storage device of claim 1, wherein the memory comprises a three-dimensional memory.

9. The data storage device of claim 1, wherein the read-only mode is re-entered after powering off the data storage device.

10. A method comprising:
    performing in a host in communication with a data storage device comprising a memory, wherein the data storage device is operating in a read-only mode which prevents the host from writing information in the memory of the data storage device that is needed for the host to boot the data storage device, wherein the information comprises a time stamp of the boot and a status of the boot:
      sending a disable read-only mode command to the data storage device to temporarily bypass the read-only mode;
      sending a write command to the data storage device to write the information in the memory needed for the host to boot the data storage device;
      backing-up the data stored in the memory of the data storage device; and
      after the data has been backed up, sending a restore read-only mode command to the data storage device; and
      powering off the data storage device.

11. The method of claim 10, wherein the disable read-only mode command is sent during a host boot stage of a multi-stage boot process.

12. The method of claim 10, wherein the disable read-only mode command is sent during a host kernel stage of a multi-stage boot process.

13. The method of claim 10, wherein the disable read-only mode command comprises a flag from an application program interface in the host.

14. The method of claim 10, wherein the restore read-only mode command comprises a flag from an application program interface in the host.

15. The method of claim 10, wherein the read-only mode is entered in response to a number of spare blocks in the memory being below a threshold.

16. The method of claim 10, wherein the data storage device is embedded in the host.

17. The method of claim 10, wherein the host comprises a mobile device.

18. The method of claim 10, wherein the memory comprises a three-dimensional memory.

19. The method of claim 10, wherein the read-only mode is re-entered after powering off the data storage device.

20. A data storage device comprising:
    a memory; and
    means for:
      receiving a disable read-only mode command from a host to bypass a read-only mode of the data storage device which prevents the host from writing information in the memory needed for the host to boot the data storage device, wherein the information comprises a time stamp of the boot and a status of the boot;
      in response to receiving the disable read-only mode command, bypassing the read-only mode to allow the host to write the information in the memory needed for the host to boot the data storage device;
      receiving commands from the host to back-up data stored in the memory;
      after the host finishes backing up the data stored in the memory, receiving a restore read-only mode command from the host prior to powering down; and
      re-entering read-only mode.

* * * * *